Jan. 23, 1934. R. B. EISOLD 1,944,557
DIRECTION SIGNAL
Filed April 14, 1932
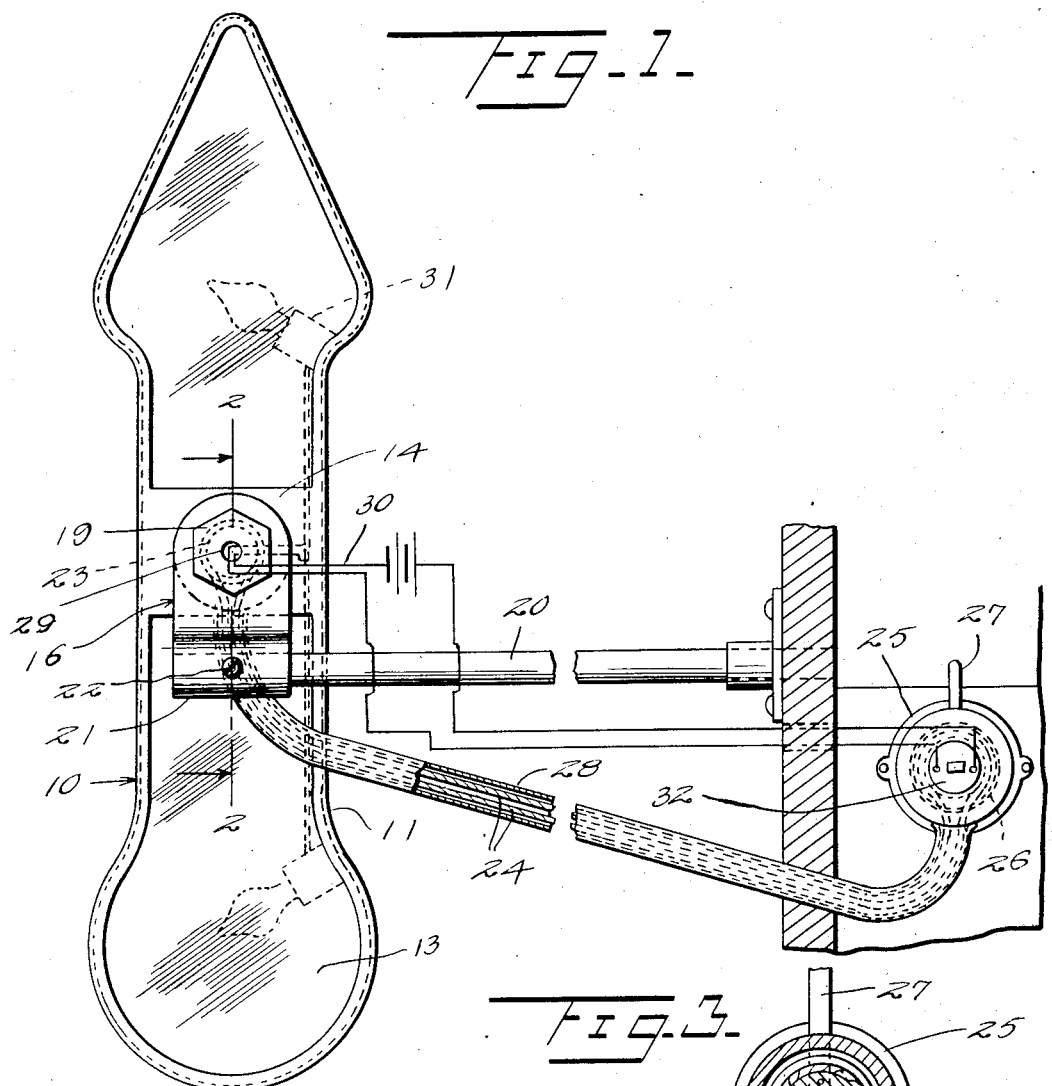
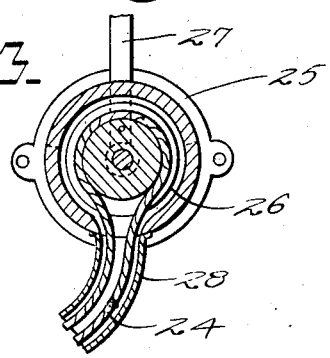
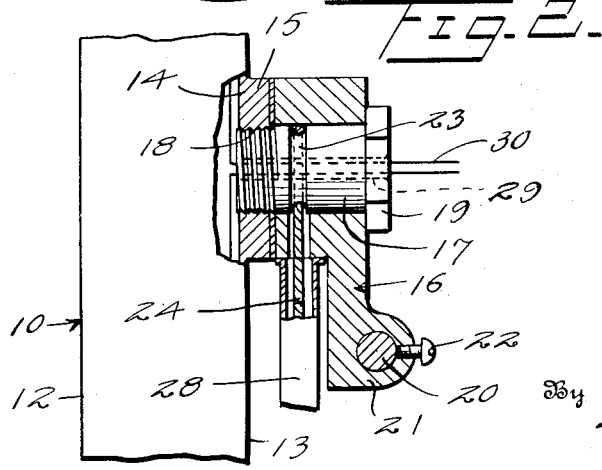
Inventor
R. B. Eisold
By Watson E. Coleman
Attorney Patented Jan. 23, 1934

1,944,557

UNITED STATES PATENT OFFICE 1,944,557

DIRECTION SIGNAL

Richard B. Eisold, Ludlow, Mass.

Application April 14, 1932. Serial No. 605,288

1 Claim. (Cl. 116—48)

This invention relates to direction signals and more particularly to a manually operated direction signal which can be mounted on any conventional type of closed vehicle.

An object of this invention is to provide a manually shiftable direction signal which is so positioned that the signal can be readily seen by persons positioned either forwardly or rearwardly of the vehicle and at the same time so positioned that the driver of the vehicle can see the exact position of the signal.

Another object of this invention is to provide a signal of this kind which includes a lighted indicating means so that the signal can be readily seen in the dark.

A further object of this invention is to provide a signal means which is exceedingly simple in construction so that it can be readily and cheaply manufactured.

The above and various other objects and advantages of this invention will in part be described in and in part be understood from the following detailed description of the present preferred embodiment, the same being illustrated in the accompanying drawing, wherein:—

Figure 1 is a detail end elevation partly broken away and partly in section of a device constructed according to the preferred embodiment of this invention, mounted on a vehicle which is shown in fragmentary sectional form.

Figure 2 is an enlarged sectional view of the connection between the signal housing and the bracket, the view being taken on the line 2—2 of Figure 1 and the signal housing being shown in detail and partly broken away.

Figure 3 is an enlarged fragmentary sectional view of the signal operating means mounted on the dashboard.

Referring to the drawing wherein like numerals of reference designate corresponding parts throughout the several views, the numeral 10 designates generally a signal member which, in the present instance, is constructed in the form of an arrow and includes a housing 11 which is provided with a front wall 12 and a rear wall 13, these walls 12 and 13 being preferably transparent, the purpose for which will be hereinafter described. This housing 11 is preferably constructed of metal and a plate or connecting bar 14 is disposed at the rear of the housing 11 and connects the two sides of the housing together.

A lug 15 is formed with this plate 14 and an adjustable bracket arm 16 is adapted to loosely engage about a pin or shaft 17 which has the inner end portion thereof threaded into the lug 15, as at 18, and the outer end 19 is provided with a head bearing against the rear face of the bracket arm 16.

An outstanding bracket member 20 has one end portion thereof secured to a portion of the frame of the vehicle and preferably, the extended portion of this bracket arm 20 is round and the lower end portion 21 of the bracket arm 16 is provided with an aperture through which the arm 20 is disposed, and the arm 16 is held in adjusted position by means of a set screw 22. The shaft 17 is provided with a peripheral groove 23 and an endless flexible member 24 is trained over this shaft 17 and disposed in the groove 23.

An operating member for the signal arrow or arm 10 comprises a housing 25 which is adapted to be secured at a convenient location within the interior of the vehicle convenient to the driver and, in the present instance, is disclosed as being mounted on the dashboard D of the vehicle. This housing 25 has a pulley 26 rotatably mounted therein and a handle or lever 27 is secured to the pulley 26 and extends outwardly of the housing so that the pulley 26 may be rotated. The cable or flexible member 24 is trained over this pulley. A flexible cable protecting member 28 is disposed about the two runs of the cable 24 so that this cable will be protected from the point where it leaves the frame of the vehicle and contacts with the bracket arm 16.

The grooved shaft 17 is provided with an axial bore 29 therethrough and a wire 30 extends through this bore and is connected to a pair of sockets 31 which are mounted in the housing 11 at desired points therein so that the interior of this housing will be lighted up during the operation of the signal at night.

The other end of the electric wire 30 is connected to a switch 32 which is carried by the housing 25 and which switch is interposed in an electric circuit of the vehicle. The operating lever 27 is adapted to have movement within a circle of 360° so that the arrow or indicating member 10 can be rotated to any desired point to indicate the desired movement of the vehicle to which the device is attached.

In the use of this device, the lever 27 may be synchronized with the signal member 10 so that when the lever 27 is in vertical position on the upper part of the housing 25, the arrow is pointing upwardly. When it is desired to make a left turn, the lever 27 can be swung downwardly approximately 45° which will swing the point of the arrow outwardly to indicate clearly to a vehicle approaching from the front or from the rear that the driver desires to make a left turn.

During the daytime, the switch 32 can be left open, but at night, when it is desired to operate the signal 10, the switch 32 can be closed so as to light up the lights in the sockets 31 and at the same time, the lever 27 can be swung into the desired position so as to carry the signal member 10 into the signalling position.

The signal 10, in the present instance, is preferably mounted on one of the front posts of the vehicle frame forwardly of the driver so that it will not interfere with the movement of a door nor interfere with the clear vision of the driver. Being positioned forward of the driver, he can readily determine exactly the position of the signal although, of course, the position of the lever 27 will determine the position of the signal 10.

It is, of course, understood that various changes and modifications may be made in the details of construction and design of the above specifically described embodiment of this invention without departing from the spirit thereof, such changes and modifications being restricted only by the scope of the following claim.

What is claimed is:—

A direction signal comprising a housing including a frame open at the front and rear sides, transparent walls closing the front and rear sides of the frame, a plate connecting opposed portions of the frame, a shaft having an axial bore and a peripheral groove, threads on one end of the shaft for threadably connecting the shaft to the plate, a head on the other end of the shaft, a vertical bracket arm through which the shaft loosely extends, a horizontal arm engaging the bracket arm to hold the bracket arm in outstanding position, a flexible tube connected at one end to said bracket arm, an operating pulley, a housing about said pulley and connected to the opposite end of said tube, and a flexible member extending through the tube and trained over the groove of said shaft and said pulley.

RICHARD B. EISOLD.